US011643519B2

(12) United States Patent
Takagi et al.

(10) Patent No.: US 11,643,519 B2
(45) Date of Patent: May 9, 2023

(54) FOAM PARTICLE MOULDED ARTICLE AND SOLE MEMBER

(71) Applicant: JSP Corporation, Tokyo (JP)

(72) Inventors: Shota Takagi, Yokkaichi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 566 days.

(21) Appl. No.: 16/348,410

(22) PCT Filed: Nov. 8, 2017

(86) PCT No.: PCT/JP2017/040248
§ 371 (c)(1),
(2) Date: May 8, 2019

(87) PCT Pub. No.: WO2018/088429
PCT Pub. Date: May 17, 2018

(65) Prior Publication Data
US 2019/0263994 A1 Aug. 29, 2019

(30) Foreign Application Priority Data

Nov. 11, 2016 (JP) .............................. JP2016-221053

(51) Int. Cl.
| | | |
|---|---|---|
| C08J 9/22 | (2006.01) | |
| A43B 13/04 | (2006.01) | |
| B29C 44/34 | (2006.01) | |
| C08J 9/18 | (2006.01) | |
| B29C 44/00 | (2006.01) | |
| C08J 9/12 | (2006.01) | |
| B29K 23/00 | (2006.01) | |
| B29K 105/00 | (2006.01) | |
| B29K 105/04 | (2006.01) | |
| B29L 31/50 | (2006.01) | |

(52) U.S. Cl.
CPC ............... *C08J 9/22* (2013.01); *A43B 13/04* (2013.01); *B29C 44/00* (2013.01); *B29C 44/3461* (2013.01); *C08J 9/12* (2013.01); *C08J 9/18* (2013.01); *B29K 2023/08* (2013.01); *B29K 2105/0085* (2013.01); *B29K 2105/046* (2013.01); *B29L 2031/504* (2013.01); *C08J 2205/052* (2013.01); *C08J 2353/00* (2013.01)

(58) Field of Classification Search
CPC ..... A43B 13/04; B29C 44/00; B29C 44/3461; B29C 67/205; C08J 9/22; C08J 9/12; C08J 9/18; C08J 2205/052; C08J 2353/00; B29K 2023/08; B29K 2104/0085; B29K 2104/046; B29L 2031/504

See application file for complete search history.

(56) References Cited

U.S. PATENT DOCUMENTS

| | | | |
|---|---|---|---|
| 4,247,650 A * | 1/1981 | Shimizu | ................. B29C 67/20 264/51 |
| 2003/0013778 A1 | 1/2003 | Sueda et al. | |
| 2006/0072098 A1 | 4/2006 | Dams | |
| 2006/0199872 A1* | 9/2006 | Prieto | ......................... C08J 9/00 521/142 |
| 2006/0205833 A1* | 9/2006 | Martinez | .................... C08J 9/04 521/142 |
| 2010/0222442 A1 | 9/2010 | Prissok et al. | |
| 2012/0046373 A1 | 2/2012 | Low et al. | |
| 2012/0322905 A1 | 12/2012 | Kusanose et al. | |
| 2013/0338246 A1* | 12/2013 | Yoshida | ................ C08J 9/0004 521/93 |
| 2014/0223776 A1* | 8/2014 | Wardlaw | ............. A43B 13/187 36/102 |
| 2014/0259329 A1 | 9/2014 | Watkins et al. | |
| 2018/0127559 A1 | 5/2018 | Takagi et al. | |
| 2019/0283287 A1 | 9/2019 | Ogaki | |

FOREIGN PATENT DOCUMENTS

| | | |
|---|---|---|
| CN | 101309956 A | 11/2008 |
| CN | 101547946 A | 9/2009 |
| CN | 102257047 A | 11/2011 |
| CN | 102388092 A | 3/2012 |
| CN | 107531932 A | 1/2018 |
| JP | 2000-344924 A | 12/2000 |
| JP | 2006-121069 A | 5/2006 |
| JP | 2008-533289 A | 8/2008 |
| JP | 2008-308619 A | 12/2008 |
| JP | 2010-178770 A | 8/2010 |
| JP | 2011-184574 A | 9/2011 |
| JP | 2013-064137 A | 4/2013 |
| JP | 2016-512850 A | 5/2016 |
| WO | 2006/099631 A1 | 9/2006 |
| WO | 2010/073589 A1 | 7/2010 |
| WO | 2011/111696 A1 | 9/2011 |
| WO | 2015/129414 A1 | 9/2015 |
| WO | 2016/181714 A1 | 11/2016 |
| WO | 2018/074286 A1 | 4/2018 |

OTHER PUBLICATIONS

"Infuse 9530 Olefin Block Copolymer" by Dow. Revision date Sep. 14, 2011. Available at http://www.cheminno.co.th/wp-content/uploads/2018/file/dow/INFUSE/TDS-INFUSE-9530.pdf. Accessed 5/36/2021. (Year: 2011).*

Zhao, Y.; Yao, C.; Chang, T.; Zhu, Y. "The Influence of DMDBS on Crystallization Behavior and Crystalline Morphology of Weakly-Phase-Separated Olefin Block Copolymer". Polymers 2019, 11, 552; doi:10.3390/polym11030552 (Year: 2019).*

(Continued)

*Primary Examiner* — Michael M Dollinger
*Assistant Examiner* — Christina H. W. Rosebach
(74) *Attorney, Agent, or Firm* — Fitch, Even, Tabin & Flannery LLP

(57) ABSTRACT

The present invention relates to an expanded beads molded article containing a block copolymer of a polyethylene block and an ethylene-α-olefin copolymer block and having a density of 30 kg/m$^3$ or more and less than 150 kg/m$^3$ and a modulus of repulsion elasticity of 60% or more. The sole member of the present invention includes the expanded beads molded article of the present invention.

9 Claims, No Drawings

(56) References Cited

OTHER PUBLICATIONS

International Search Report for PCT/JP2017/040248, dated Feb. 13, 2018, and English Translation submitted herewith (5 pages).
Extended European Search Report issued in corresponding EP Application No. 17868684.6 dated Mar. 27, 2020 (7 pages).
"Types and processes of high-magnification foam moldings," Composite technology for plastic molding, CMC Co., Ltd., Sep. 1997, pp. 107-108.

* cited by examiner

FOAM PARTICLE MOULDED ARTICLE AND SOLE MEMBER

CROSS-REFERENCE TO RELATED APPLICATIONS

This application is a U.S. national phase application filed under 35 U.S.C. § 371 of International Application Number PCT/JP2017/040248, filed Nov. 8, 2017, designating the United States, which claims priority from Japanese Application Number 2016-221053, filed Nov. 11, 2016.

Field of the Invention

The present invention relates to an expanded beads molded article and a sole member using the same.

Background of the Invention

Expanded polyolefin resin beads can be molded into various shapes depending on purposes thereof, and an expanded polyolefin resin beads molded article obtained through in-mold molding of the expanded beads is applied to a wide range of purposes including various kinds of a packaging and shock-absorbing material, a shock absorber for automobiles, a building material, and the like. As for an expanded beads molded article that is used as a seat cushioning material, a shock-absorbing material, and the like, a molded article having not only shock-absorbing property for impacts, but also more lightweight and flexibility are demanded.

As a novel expanded article suitable for these purposes, replacing the polyolefin resin expanded beads, a thermoplastic polyurethane expanded article excellent in repulsion elasticity is proposed (see, for example, PTLs 1 and 2).

CITATION LIST

Patent Literatures

PTL 1: US 2010/0222442 A
PTL 2: JP 2008-533289 A

SUMMARY OF INVENTION

However, the thermoplastic polyurethane expanded article described in PTL 1 has a problem in lightweight property although it is excellent in repulsion elasticity.

PTL 2 describes about an expanded article of an ethylene-α-olefin copolymer of 150 kg/m$^3$ or more and 600 kg/m$^3$ or less, but a further lightweight material is demanded.

In view of the aforementioned objects, the present inventors have made earnest investigations with paying attention to an expanded beads molded article of a block copolymer of a polyethylene block and an ethylene-α-olefin copolymer block, and as a result, it has been found that the problem can be solved by the constitutions shown below, and thus the present invention has been completed.

Specifically, the present invention relates to the following.

[1] An expanded beads molded article, containing a block copolymer of a polyethylene block and an ethylene-α-olefin copolymer block and having a density of 30 kg/m$^3$ or more and less than 150 kg/m$^3$ and a modulus of repulsion elasticity (R1) of 60% or more.

[2] The expanded beads molded article according to the item [1], which has an average cell wall thickness of 1 μm or more and 8 μm or less.

[3] The expanded beads molded article according to the item [1] or [2], which has a ratio (R1/R2) of the modulus of repulsion elasticity (R1) of the expanded beads molded article to a modulus of repulsion elasticity (R2) of the block copolymer constituting the expanded beads molded article of 1.2 or more and 2.0 or less.

[4] The expanded beads molded article according to any one of the items [1] to [3], which has a closed cell ratio of 60% or more.

[5] The expanded beads molded article according to any one of the items [1] to [4], which has a tensile elongation of 120% or more.

[6] The expanded beads molded article according to any one of the items [1] to [5], wherein the expanded beads molded article has a xylene insoluble fraction of 30% by weight or more and 70% by weight or less based on the total amount of the expanded beads molded article by a hot xylene extraction method.

[7] The expanded beads molded article according to any one of the items [1] to [6], which has a 25% compression set at 50° C. of 2% or more and 15% or less.

[8] The expanded beads molded article according to any one of the items [1] to [7], which has a surface of the molded article having a type C durometer hardness of 15 or more and 50 or less.

[9] The expanded beads molded article according to any one of the items [1] to [8], wherein the block copolymer is a multi-block copolymer of a polyethylene block and an ethylene-1-octene copolymer block.

[10] A sole member including the expanded beads molded article according to any one of the items [1] to [9].

According to the present invention, an expanded beads molded article that achieves both the lightweight property and the repulsion elasticity can be provided by forming the expanded beads molded article with the particular block copolymer and forming a foam cell providing the particular density.

According to the present invention, furthermore, a sole member that achieves both the lightweight property and the repulsion elasticity can be provided.

DESCRIPTION OF EMBODIMENTS

The present invention relates to an expanded beads molded article containing a block copolymer of a polyethylene block and an ethylene-α-olefin copolymer block, in which the expanded beads molded article has a density of 30 kg/m$^3$ or more and less than 150 kg/m$^3$, and the expanded beads molded article has a modulus of repulsion elasticity (R1) of 60% or more.

The expanded beads molded article of the present invention will be described in detail below.

The expanded beads molded article of the present invention is an expanded beads molded article of a block copolymer of a polyethylene block and an ethylene-α-olefin copolymer block (which may be hereinafter referred simply to as a block copolymer (I)).

Block Copolymer (I)

The block copolymer (I) has a polyethylene block and an ethylene-α-olefin copolymer block.

The polyethylene block corresponds to a hard block, and the ethylene-α-olefin copolymer block corresponds to a soft block. The polyethylene block and the ethylene-α-olefin copolymer block are preferably arranged in a linear form. A third block is preferably not contained.

In the polyethylene block, the proportion of the component of the constitutional unit derived from ethylene is preferably more than 95% by weight, and more preferably more than 98% by weight, based on the weight of the polyethylene block. In the ethylene-α-olefin copolymer block, the proportion of the component of the constitutional unit derived from the α-olefin is preferably more than 5% by weight, more preferably more than 10% by weight, and further preferably more than 15% by weight, based on the weight of the ethylene-α-olefin copolymer block.

The proportion of the polyethylene block can be calculated based on data obtained by differential scanning calorimetry (DSC) or nuclear magnetic resonance (NMR).

The ethylene-α-olefin copolymer block in the block copolymer (I) is preferably a block of a copolymer of a $C_3$ to $C_{20}$ α-olefin and ethylene. Examples of the α-olefin copolymerized with ethylene in the ethylene-α-olefin copolymer block include propylene, 1-butene, 1-pentene, 1-hexene, 1-heptene, 1-octene, 1-nonene, 1-decene, 3-methyl-1-butene, and 4-methyl-1-pentene, which may be used in combination. From the standpoint of the industrial availability, the characteristics, the economic efficiency, and the like, examples of the α-olefin copolymerized with ethylene include propylene, 1-butene, 1-hexene, and 1-octene, and 1-octene is particularly preferred.

The block copolymer (I) may have any of a di-block structure, a tri-block structure, and a multi-block structure, and particularly preferably has a multi-block structure. Examples of the multi-block copolymer include the ethylene-α-olefin copolymer described in PTL 1. Examples of the commercially available products of the multi-block copolymer include "INFUSE", a trade name, produced by The Dow Chemical Company.

The block copolymer (I) can be produced by using a known polymerization method using a known olefin polymerization catalyst.

Characteristics of Block Copolymer (I)

The density of the block copolymer (I) is preferably 800 kg/m³ or more, more preferably 850 kg/m³ or more, and further preferably 860 kg/m³ or more, and is preferably 1,000 kg/m³ or less, more preferably 900 kg/m³ or less, and further preferably 890 kg/m³ or less.

The melting point of the block copolymer (I) is preferably 110° C. or more, and more preferably 115° C. or more, and is preferably 150° C. or less, and more preferably 140° C. or less. In the case where the melting point of the block copolymer (I) is in the range, the compression set at a high temperature can be made small. The melting point of the block copolymer (I) may be measured by the heat flux differential scanning calorimetry described in JIS K7121 (1987) in such a manner that the block copolymer is heated from 30° C. to 200° C. at a temperature rise rate of 10° C./min, then cooled to 30° C. at a cooling rate of 10° C./min, and then again heated from 30° C. to 200° C. at a temperature rise rate of 10° C./min to provide a DSC curve, and the melting point is obtained from the peak temperature of the endothermic peak determined by the DSC curve. In the case where plural endothermic peaks appear in the DSC curve for the second heating, the peak temperature of the endothermic peak having the largest area is designated as the melting point.

Flexural Modulus of Block Copolymer (I) Constituting Expanded Beads Molded Article The flexural modulus of the block copolymer (I) is preferably 10 MPa or more, more preferably 12 MPa or more, and further preferably 15 MPa or more, and is preferably 100 MPa or less, more preferably 50 MPa or less, and further preferably 40 MPa or less. The flexural modulus of the block copolymer (I) is a value that is measured by the measurement method described in JIS K7171 (2008).

Additional Additive

The block copolymer (I) may contain an additional additive in such a range that does not impair the objects and effects of the present invention. Examples of the additional additive include an antioxidant, an ultraviolet ray inhibitor, an antistatic agent, a flame retardant, a flame retarding assistant, a metal deactivator, a conductive filler, and a cell controlling agent.

The additional additive is preferably 20 parts by weight or less, more preferably 10 parts by weight or less, and further preferably 5 parts by weight or less, per 100 parts by weight of the block copolymer (I). The additive is generally used in a requisite minimum amount. The additive may be contained in the polymer particles, for example, in such a manner that the additive is added to an extruder along with the block copolymer (I) and kneaded therewith in the production of the polymer particles.

The block copolymer (I) may contain an additional polymer different from the block copolymer (I) in such a range that does not impair the objects and effects of the present invention. Examples of the additional polymer different from the block copolymer (I) include a thermoplastic resin and a thermoplastic elastomer, such as a polyolefin resin (e.g., a polyethylene resin, a polypropylene resin, and a polybutene resin), and a polystyrene resin. The mixing ratio of the additional polymer is preferably 10 parts by weight or less, and more preferably 5 parts by weight or less, per 100 parts by weight of the block copolymer (I), and it is particularly preferred that only the block copolymer (I) is contained.

Density of Expanded Beads Molded Article: Molded Article Density

The density of the expanded beads molded article of the present invention (molded article density) is 30 kg/m³ or more and less than 150 kg/m³. In the case where the molded article density is 150 kg/m³ or more, the desired objects may not be achieved from the standpoint of the lightweight property. In the case where the molded article density is less than 30 kg/m³, a favorable molded article may not be obtained, and the modulus of repulsion elasticity thereof may not be satisfied. From this standpoint, the density of the expanded beads molded article is preferably 40 kg/m³ or more, more preferably 45 kg/m³ or more, and further preferably 50 kg/m³ or more, and is preferably 145 kg/m³ or less, more preferably 140 kg/m³ or less, and further preferably 130 kg/m³ or less. The density of the expanded beads molded article (kg/m³) can be obtained by dividing the weight W (g) of the molded article by the volume V (L) thereof (W/V). The volume V of the expanded beads molded article may be measured by the submersion method.

Average Cell Wall Thickness of Expanded Beads Molded Article

The average cell wall thickness (Tm) of the expanded beads molded article is preferably 1 μm or more and 8 μm or less. With the aforementioned range, the cell wall forming the cells of the expanded beads molded article withstands an impact of an external force and exhibits a repulsion force. From this standpoint, the lower limit of the average cell wall thickness of the expanded beads molded article is more preferably 2 μm. The upper limit of the average cell wall thickness is more preferably 7 μm, and further preferably 6 μm. In the present invention, the cell wall of the expanded beads molded article is formed of the particular block copolymer (I) and has the aforementioned cell wall thickness, and thereby the expanded beads molded article having particularly excellent repulsion elasticity can be provided.

The average cell wall thickness may be measured in the following manner.

A cut cross sectional surface obtained by cutting the expanded beads molded article into substantially equal halves is imaged with a scanning electron microscope at a magnification of 300. On the resulting cross sectional micrograph, the thickness of the cell wall is measured in at least 10 positions. The arithmetic average value of the measured values is designated as the average cell wall thickness of the expanded beads molded article. The thickness of the cell wall shows the minimum distance on the cell wall.

Modulus of Repulsion Elasticity of Expanded Beads Molded Article

The modulus of repulsion elasticity (R1) of the expanded beads molded article is 60% or more. In the case where the modulus of repulsion elasticity is less than 60%, an expanded beads molded article excellent in repulsion applied to such purposes as a sole member may not be obtained. In particular, the expanded beads constituting the expanded article are formed of the block copolymer (I) and have a foam cell satisfying the particular apparent density range, and thereby the cells of the expanded beads forming the expanded beads molded article withstand an external force and exhibit a high modulus of repulsion elasticity. In particular, the expanded beads molded article formed of the block copolymer (I) of the present invention has a higher modulus of repulsion elasticity by decreasing the molded article density, and exhibits peculiar characteristics that are different from the other elastomers, such as a thermoplastic polyurethane and an amide elastomer. From this standpoint, the modulus of repulsion elasticity (R1) of the expanded beads molded article is preferably 65% or more and is preferably 80% or less. The effect of the enhancement of the modulus of repulsion elasticity may be largely exhibited in the case where the molded article density is 30 kg/m³ or more and less than 150 kg/m³, and may be more largely exhibited in the case where the molded article density is 40 kg/m³ or more and 145 kg/m³ or less. The modulus of repulsion elasticity of the expanded beads molded article may be measured based on JIS K6255 (2013).

Modulus of Repulsion Elasticity (R2) of Block Copolymer (I)

The modulus of repulsion elasticity (R2) of the block copolymer (I) constituting the expanded beads molded article is preferably 40% or more and 60% or less. In the case where the modulus of repulsion elasticity of the block copolymer (I) is in the range, the cell wall in the foam cell of the expanded beads molded article formed through fusion bonding of the expanded beads can exhibit sufficient repulsion elasticity.

In the case where the expanded beads have a crosslinked structure, the modulus of repulsion elasticity (R2) of the block copolymer (I) constituting the expanded beads molded article is a measured value of the expanded beads or a specimen of the block copolymer (I) constituting the expanded beads molded article, i.e., the block copolymer (I) after crosslinking. The modulus of repulsion elasticity (R2) of the block copolymer (I) constituting the expanded beads molded article is preferably 45% or more and is preferably 55% or less.

The modulus of repulsion elasticity (R2) of the block copolymer (I) may be calculated in the same manner as in the measurement of R1 described above according to JIS K6255 (2013) for a test piece obtained by sufficiently defoaming the expanded beads molded article by heat press several times.

In the case where the block copolymer (I) constituting the expanded beads or the expanded beads molded article has a crosslinked structure, there is a tendency that the measured value of the modulus of repulsion elasticity becomes smaller than the modulus of repulsion elasticity of the non-crosslinked block copolymer (I) as the raw material. The block copolymer (I) is preferably crosslinked for retaining the particular foam cell in the production of the expanded beads, but it is considered that the modulus of repulsion elasticity of the block copolymer (I) is decreased due to the crosslinking of the soft segment. Therefore, the crosslinking is preferably performed to make the particular hot xylene insoluble fraction described later.

The modulus of repulsion elasticity of the expanded beads molded article is largely enhanced from the modulus of repulsion elasticity of the crosslinked block copolymer (I) by the formation of the particular foam cell through the expansion. In the expanded beads molded article of the present invention, an embodiment, in which the block copolymer (I) constituting the cell wall has the particular modulus of repulsion elasticity, and has a foam cell providing the particular density, can be said to be a preferred embodiment from the standpoint of the enhancement of the modulus of repulsion elasticity of the expanded beads molded article. From this standpoint, the ratio (R1/R2) of the modulus of repulsion elasticity (R1) of the expanded beads molded article to the modulus of repulsion elasticity (R2) of the block copolymer (I) constituting the expanded beads molded article is preferably 1.2 or more and 2.0 or less, and more preferably 1.2 or more and 1.5 or less.

Xylene Insoluble Fraction of Expanded Beads Molded Article by Hot Xylene Extraction Method In the expanded beads molded article of the present invention, the xylene insoluble fraction (i.e., the xylene insoluble fraction by a hot xylene extraction method) of the expanded beads molded article is preferably 10% by weight or more and 70% by weight or less based on the total amount of the expanded beads molded article, and more preferably 30% by weight or more and 70% by weight or less based on the total amount of the expanded beads molded article. In the case where the xylene insoluble fraction is in the range, the cell wall may have sufficient strength to form a closed foam cell in the expanded beads, and the fusion bondability among the expanded beads may be excellent, thereby providing the expanded beads molded article excellent repulsion elasticity. From this standpoint, the xylene insoluble fraction of the expanded beads is further preferably 35% by weight or more, and particularly preferably 40% by weight or more, and is further preferably 60% by weight or less, and particularly preferably 55% by weight or less. In the present invention, the xylene insoluble fraction is one of the indices showing the crosslinked state of the block copolymer (I) constituting the expanded article, and may be measured in the following manner.

The xylene insoluble fraction can be controlled by the amount of the crosslinking agent added described later, and can also be controlled by the agitation condition, the heating condition, and the like in crosslinking the polymer particles in a closed vessel.

The xylene insoluble fraction can be obtained in such a manner that approximately 1.0 g of a test piece cut out from a part of the expanded beads molded article is weighed, the weight thereof is designated as the specimen weight W1, the weighed test piece is placed in a 150 mL round-bottom flask, 100 mL of xylene is added thereto and heated with a mantle heater under refluxing for 6 hours, the insoluble residue is separated by filtration with a metallic mesh of 100 mesh and dried in a vacuum dryer at 80° C. for 8 hours or more, the weight W2 of the resulting dried matter is measured, the percentage of the weight W2 with respect to the specimen weight W1 is obtained by ((W2/W1)×100) (%), and the average value of the five measured value (N=5) is designated as the xylene insoluble fraction.

The xylene insoluble fraction of the expanded beads constituting the expanded beads molded article can also be measured in the same manner by using the expanded beads as the specimen, and the values of the expanded beads and the expanded beads molded article are substantially the same as each other since the xylene insoluble fraction is not changed through the in-mold molding.

Closed Cell Ratio of Expanded Beads Molded Article

The closed cell ratio of the expanded beads molded article is preferably 60% or more. In the case where the closed cell ratio is in the range, the repulsion against an external force can be further readily exhibited since each cell is formed independently. The upper limit of the closed cell ratio is 100%. From this standpoint, the closed cell ratio of the expanded beads molded article is preferably 62% or more, and more preferably 65% or more, and is preferably 95% or less, and more preferably 90% or less. The closed cell ratio of the expanded beads molded article may be measured according to Procedure C described in ASTM D2856-70 with Air Pycnometer 930, produced by Toshiba Beckman Co., Ltd.

Compression Set of Expanded Beads Molded Article

The expanded beads molded article of the present invention preferably has a compression set, which is measured after compressing the molded article to a strain of 25% at 23° C. for 22 hours, releasing to the atmospheric pressure at 23° C., and then allowing to stand for 22 hours, of 5% or less, more preferably 3% or less, and further preferably 2% or less.

The expanded beads molded article of the present invention preferably has a compression set, which is measured after compressing the molded article to a strain of 25% at 50° C. for 22 hours, releasing to the atmospheric pressure at 50° C., and then allowing to stand for 22 hours, of 15% or less, more preferably 12% or less, and further preferably 10% or less. The lower limit of the compression set is not particularly limited, and may be, for example, 2%.

With the aforementioned ranges, the expanded beads molded article may be excellent in restorability after compressing the molded article, and thus may be suitable for such purposes as a seat cushioning material, a pad material for sporting, and a shoe sole material. In particular, the expanded beads molded article of the present invention may have excellent restorability even under a high temperature compression condition. From the standpoint of the restorability at a high temperature, the block copolymer (I) preferably has a melting point of 110° C. or more and 150° C. or less. The compression set may be measured according to JIS K6767 (1999).

Surface Hardness of Expanded Beads Molded Article

The surface hardness of the expanded beads molded article of the present invention is preferably 15 or more and 50 or less, and more preferably 17 or more and 40 or less, in terms of type C durometer hardness. In the case where the type C durometer hardness is in the range, the expanded beads molded article may have characteristics rich in cushioning property and elastic restorability. The surface hardness may be measured based on JIS K7312 (1996).

Tensile Elongation of Expanded Beads Molded Article

The tensile elongation of the expanded beads molded article of the present invention is preferably 120% or more. With the aforementioned range, the expanded beads molded article may have good fusion bondability among the expanded beads, and can be applied to such purposes as a seat cushioning material, a pad material for sporting, and a shoe sole material. From this standpoint, the tensile elongation is more preferably 130% or more, and further preferably 150% or more. The upper limit of the tensile elongation of the expanded beads molded article may be approximately 500%, and is preferably 400%, and more preferably 300%. The tensile elongation may be measured according to JIS K6767 (1999). The test piece therefor may be a cut out piece having all the surfaces thereof are cut surfaces excluding the skin portion, obtained from the expanded beads molded article.

Tensile Strength of Expanded Beads Molded Article

The tensile strength of the expanded beads molded article of the present invention is preferably 0.2 MPa or more. The expanded beads molded article obtained in the present invention is a molded article having the expanded beads that are firmly fusion bonded to each other, and the tensile properties of the molded article are particularly enhanced. The tensile strength that is 0.3 MPa or more may suggest that the fusion bondability among the expanded beads of the expanded beads molded article is good, and the molded article may be excellent in durability and may be applied to such purposes as a seat cushioning material, a pad material for sporting, a sole (shoe sole) member, and a sock lining member. From this standpoint, the tensile strength is more preferably 0.3 MPa or more. The upper limit of the tensile strength of the expanded beads molded article may be approximately 1 MPa, and is preferably 0.9 MPa. The tensile strength can be measured according to JIS K6767 (1999).

Method for Producing Expanded Beads

Examples of the method for producing the expanded beads include a method, in which the block copolymer (I)

and a blowing agent are supplied to an extruder and melted therein, and the block copolymer (I) is extruded and expanded from a die attached to the end of the extruder to provide an expanded material of the block copolymer (I), which is cooled and then pelletized to cut into particles, a method, in which particles of the block copolymer (I) are produced and then impregnated with a blowing agent in a closed vessel to provide expandable particles, and the expandable particles are released from the closed vessel to provide expanded beads, and a method, in which the expandable particles of the block copolymer (I) are taken out from the closed vessel, dehydrated by drying, and then expanded by heating with a heating medium to provide expanded beads.

In the case where the block copolymer (I) is crosslinked, examples of the method for producing the expanded beads include a method, in which the block copolymer (I), a crosslinking agent, and a blowing agent are supplied to an extruder and melted therein to crosslink the block copolymer (I), and the crosslinked block copolymer (I) is extruded and expanded from a die attached to the end of the extruder to provide a crosslinked expanded material of the block copolymer (I), which is cooled and then pelletized to cut into particles, and a method, in which expandable crosslinked particles obtained by the processes (A) and (B) described later are expanded by releasing from the closed vessel to provide expanded beads. The method of crosslinking the polymer particles by using an organic peroxide has been described above, but the crosslinking treatment in the present invention is not limited to the use of an organic peroxide, and the crosslinked particles or the expanded beads may be obtained through a crosslinking treatment by a known method, such as an electron beam crosslinking method.

As a method for producing expanded beads used in the expanded beads molded article of the present invention, specifically, non-expanded particles may be produced by steps of kneading and granulating the block copolymer (I) as shown in the process (A) described later. Subsequently, the resulting non-expanded particles are subjected to the process (B) including steps of crosslinking, impregnating with a blowing agent, and expanding, so as to produce the expanded beads.

In the case where the expanded beads are produced by the aforementioned processes, the melt flow rate at 190° C. and a load of 2.16 kg of the block copolymer (I) may be selected from a range of preferably 2 g/10 min or more, more preferably 3 g/10 min or more, and further preferably 4 g/10 min or more, and a range of preferably 10 g/10 min or less, more preferably 8 g/10 min or less, and further preferably 7 g/10 min or less. In the case where the melt flow rate is in the range, the expanded beads of the block copolymer (I) may have good fusion bondability, and the expanded beads molded article may have excellent repulsion. The melt flow rate is a value of the block copolymer (I) before the crosslinking step described later measured according to JIS K7210-1 (2014) under conditions of a temperature of 190° C. and a load of 2.16 kg.

Process (A): Steps of Kneading and Granulating Block Copolymer (I)

Particles of the block copolymer (I) (which may be hereinafter referred to as "polymer particles") are produced by a known granulating method, such as a method, in which the block copolymer is supplied to an extruder and kneaded to form a molten kneaded material, the molten kneaded material is extruded from the extruder into a strand form, and the strand is cut into a size suitable for forming the expanded beads. For example, the molten kneaded material having been extrusion-molded into a strand form in the aforementioned method is cooled with water, and then cut into a prescribed length, so as to provide the polymer particles having a target particle weight.

The average weight per one of the polymer particles is preferably 0.8 mg or more and 8 mg or less. The polymer particles may contain known additives, such as a flame retardant, a flame retarding assistant, a plasticizer, an antistatic agent, an antioxidant, an ultraviolet ray absorbent, a light stabilizer, a conductive filler, and an antibacterial agent. The additives may be added in the step of kneading in the process (A) to obtain the polymer particles.

A cell controlling agent (which may be referred to as a "foam nucleating agent" or a "nucleating agent") may be added to the polymer particles. Examples of the cell controlling agent include an inorganic material, such as talc, mica, zinc borate, calcium carbonate, silica, titanium oxide, gypsum, zeolite, borax, aluminum hydroxide, and carbon, and an organic nucleating agent, such as a phosphoric acid nucleating agent, a phenol nucleating agent, an amine nucleating agent, and polyethylene fluoride resin powder of polytetrafluoroethylene (PTFE) and the like. The cell controlling agent used is preferably zinc borate.

The cell controlling agent may be contained in the polymer particles by supplying to the extruder in the process of providing the polymer particles. The cell controlling agent is preferably contained by a method using a master batch. The proportion of the cell controlling agent in the polymer particles is preferably 0.01 part by weight or more and 2 parts by weight or less per 100 parts by weight of the block copolymer (I) in the polymer particles.

The average particle diameter of the cell controlling agent is preferably 0.01 μm or more, and more preferably 0.1 μm or more, and is preferably 50 μm or less, and more preferably 30 μm or less. The average particle diameter means a median diameter (d50) measured by the laser diffractive scattering particle size distribution measurement.

The expanded beads used in the present invention can be expanded beads having a target average cell diameter and a target average surface layer thickness by changing the expanding conditions, such as the kind and the amount of the cell controlling agent added, the expanding method, the expanding temperature, the amount of the blowing agent, and the expanding atmosphere, and the characteristics of the resin. For example, in the case where the amount of the cell controlling agent (foam nucleating agent) added is increased, the amount of foam nuclei may be increased to provide a tendency that the size of the cells is decreased, and the cell wall thickness is decreased.

Process (B): Steps of Crosslinking, Impregnating with Blowing Agent, and Expanding Polymer Particles In the process (B), the polymer particles are dispersed in a dispersing medium, such as water, along with the crosslinking agent in a closed vessel, such as an autoclave, and the crosslinked particles are impregnated with the blowing agent by heating under agitation to soften and crosslink the polymer particles, so as to provide expandable particles. Thereafter, the expandable particles are expanded to provide the expanded beads.

Dispersing Medium

The dispersing medium used in the production of the expanded beads used in the expanded beads molded article of the present invention is not particularly limited, as far as the dispersing medium does not dissolve the polymer particles. Examples of the dispersing medium include water, ethylene glycol, glycerin, methanol, and ethanol. The dispersing medium is preferably water.

In the process (B), a dispersant may be further added to the dispersing medium. Examples of the dispersant include an organic dispersant, such as polyvinyl alcohol, polyvinylpyrrolidone, and methyl cellulose, and a sparingly soluble inorganic salt, such as aluminum oxide, zinc oxide, kaolin, mica, magnesium phosphate, and tricalcium phosphate. Among these, kaolin is preferred as the dispersant. A surfactant may be further added to the dispersing medium. Examples of the surfactant include sodium oleate and a sodium alkylbenzenesulfonate, such as sodium dodecylbenzenesulfonate, and also include an anionic surfactant, a nonionic surfactant, and the like that are generally used in suspension polymerization. The surfactant is preferably a sodium alkylbenzenesulfonate.

Crosslinking Agent and Crosslinking

In the process (B), a crosslinking agent may be used for crosslinking the polymer particles. The crosslinking agent may be added to the dispersing medium in advance, and may be added to the dispersing medium after dispersing the polymer particles therein. The crosslinking agent is not particularly limited, as far as the crosslinking agent can crosslink the block copolymer (I). The crosslinking agent used may be a known organic peroxide used for crosslinking a polyethylene resin, and examples thereof include the Percumyl-based compound, such as dicumyl peroxide and tert-butylcumyl peroxide, the Perbutyl-based compound, such as 1,1-bis(tert-butylperoxy)-3,3,5-trimethylcyclohexane, 2,5-dimethyl-2,5-di(tert-butylperoxy) hexane, and di-tert-butyl peroxide, the Perhexyl-based compound, such as tert-hexyl peroxybenzoate, and the Perocta-based compound, such as 1,1,3,3-tetramethylbutyl peroxy-2-ethylhexanoate. Among these, the Percumyl-based compound and the Perbutyl-based compound are preferred, and dicumyl peroxide is more preferred. These compounds may be used alone or as a combination of two or more kinds thereof. The amount of the crosslinking agent mixed is preferably 0.1 part by weight or more, and more preferably 0.2 part by weight or more, and is preferably 8 parts by weight or less, and more preferably 5 parts by weight or less, per 100 parts by weight of the block copolymer (I) (polymer particles).

In the case where the amount of the crosslinking agent added is in the range, the multi-block copolymer constituting the polymer particles is crosslinked to provide crosslinked particles having appropriate crosslinking. The crosslinked particles can be sufficiently expanded, and in the expansion, the cell wall forming the cells can sufficiently withstand the expansion.

The crosslinking reaction is preferably performed at a temperature that is equal to or higher than the temperature, at which the block copolymer (I) constituting the polymer particles dispersed in the dispersing medium is softened, and the crosslinking agent is substantially decomposed, which is specifically the 1-hour half-life period temperature of the organic peroxide or more and the melting point of the block copolymer (I) or more. The temperature may be retained for 1 to 200 minutes to perform the crosslinking.

Expansion

A blowing agent for expanding the crosslinked particles obtained through the crosslinking of the polymer particles is added to the dispersing medium in the closed vessel. It is preferred that the crosslinked particles in a softened state are impregnated with the blowing agent. The temperature for the impregnation with the blowing agent is not particularly limited, as far as the temperature is equal to or higher than the temperature, at which the polymer particles or the crosslinked particles are in a softened state, and is preferably 100° C. or more, more preferably 130° C. or more, and further preferably 140° C. or more, and is preferably 180° C. or less, more preferably 170° C. or less, and further preferably 165° C. or less. The impregnation of the blowing agent may be performed before the crosslinking step, during the crosslinking step, or after the crosslinking step as far as it is performed before the expanding step.

Blowing Agent

The blowing agent used is not particularly limited, as far as the blowing agent can expand the crosslinked particles. Examples of the blowing agent include an inorganic physical blowing agent, such as air, nitrogen, carbon dioxide, argon, helium, oxygen, and neon, and an organic physical blowing agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, an inorganic physical blowing agent is preferred since it does not deplete the ozone layer and is inexpensive, in which nitrogen, air, and carbon dioxide are more preferred, and carbon dioxide is particularly preferred. The blowing agents may be used alone or as a combination of two or more kinds thereof. The amount of the blowing agent mixed may be determined in consideration of the apparent density of the target expanded beads, the kind of the block copolymer (I), the kind of the blowing agent, and the like, and is generally preferably 2 parts by weight or more and 20 parts by weight or less for the organic physical blowing agent and preferably 0.5 part by weight or more and 20 parts by weight or less for the inorganic physical blowing agent, per 100 parts by weight of the block copolymer (I). The crosslinking, impregnating, and expanding steps described above are preferably performed as a series of steps in the same closed vessel.

Production of Expanded Beads

The expandable crosslinked particles having been impregnated with the blowing agent and heated are discharged to an atmosphere having a pressure that is lower than the pressure in the closed vessel, so as to provide the expanded beads. Specifically, while retaining the pressure in the closed vessel to a pressure equal to or higher than the vapor pressure of the blowing agent, one end of the closed vessel under the water surface is opened, so as to discharge the expandable crosslinked particles containing the blowing agent along with the dispersing medium from the interior of the closed vessel to an atmosphere having a pressure that is lower than the pressure in the closed vessel, generally to the atmospheric pressure, thereby expanding the expandable crosslinked particles (which may be hereinafter referred to as a direct expanding method). The expanded beads can be produced in this manner. In the case where the expanded beads are produced by the direct expanding method, there is a tendency that the cell diameter in the surface layer of the expanded beads is decreased, and the cell wall thickness on the surface of the expanded beads is decreased, and thereby the fusion bondability among the expanded beads can be particularly enhanced.

Average Cell Diameter of Expanded Beads

The average cell diameter (a) of the expanded beads used in the expanded beads molded article of the present invention is preferably 50 μm or more, more preferably 60 μm or more, and further preferably 70 μm or more, and is preferably 200 μm or less, more preferably 180 μm or less, and further preferably 160 μm or less. In the case where the average cell diameter is in the range, the cells can be prevented from being broken to form continuous cells in molding, and the fusion bondability can be prevented from being deteriorated, resulting in the favorable expanded beads molded article.

The average cell diameter may be measured in the following manner according to ASTM D3576-77. A cross sectional surface obtained by cutting the center portion of the expanded bead into substantially equal halves is imaged with a scanning electron microscope. On the resulting cross sectional micrograph, straight lines are drawn from the approximately center of the cross sectional surface of the expanded bead toward eight directions at regular intervals to the surface of the expanded bead, and the number of cells intersecting the straight lines is counted. A value obtained by dividing the total length of the straight lines by the number of the counted cells is designated as an average chord length of the cell. The cell diameter of the expanded bead is calculated by dividing the chord length by 0.616. The operation is performed for at least 10 expanded beads, and the arithmetic average value of the cell diameters of the expanded beads is designated as the average cell diameter.

Apparent Density and Average Bead Diameter of Expanded Beads

The apparent density of the expanded beads used in the expanded beads molded article of the present invention is preferably 50 kg/m$^3$ or more, more preferably 55 kg/m$^3$ or more, and further preferably 60 kg/m$^3$ or more, and is preferably 200 kg/m$^3$ or less, more preferably 180 kg/m$^3$ or less, and further preferably 160 kg/m$^3$ or less. In the case where the apparent density of the expanded beads is in the range, the expanded beads molded article having the target molded article density can be obtained.

The apparent density can be obtained in such a manner that a measuring cylinder having ethanol placed therein is prepared, in which 500 or more expanded beads (weight of the group of expanded beads: Wt) are submerged with a metallic mesh or the like, and the volume of the group of expanded beads obtained from the elevation of the ethanol level is divided by the weight of the group of expanded beads.

The average bead diameter of the expanded beads used in the expanded beads molded article of the present invention is preferably 0.5 mm or more, and more preferably 1 mm or more, and is preferably 10 mm or less, and more preferably 6 mm or less. In the case where the average bead diameter of the expanded beads is in the range, the expanded beads can be readily produced, and in the in-mold molding of the expanded beads, the expanded beads can be readily filled in a mold. The average bead diameter of the expanded beads can be controlled, for example, by controlling the amount of the blowing agent, the expanding condition, the particle diameter of the polymer particles, and the like. The average bead diameter of the expanded beads can be obtained in such a manner that arbitrary 100 expanded beads each are measured for the maximum diameter, and the average value of the calculated values is designated as the average diameter of the expanded beads.

Bead Weight of Expanded Beads

The bead weight of the expanded beads used in the expanded beads molded article of the present invention (which may be hereinafter referred simply to as "expanded beads") is preferably 0.8 mg or more and 15 mg or less, and more preferably 1 mg or more and 6 mg or less. With the aforementioned range, the expanded beads can be readily produced, and in the in-mold molding of the expanded beads, the expanded beads can be readily filled in a mold, resulting in the excellent expanded beads molded article.

Expanded Beads Molded Article

The expanded beads molded article of the present invention can be obtained by subjecting the expanded beads of the block copolymer of a polyethylene block and an ethylene-α-olefin copolymer block to in-mold molding.

In-Mold Molding

The expanded beads molded article can be obtained by filling the expanded beads in a mold, and heating with a heating medium, such as steam, for molding, according to a known method. Specifically, the expanded beads molded article can be obtained in such manner that the expanded beads are filled in a mold, and then the expanded beads are heated and secondarily expanded by introducing a heating medium, such as steam, into the mold, thereby forming into the shape of the molding cavity through fusion bonding of the expanded beads to each other. The in-mold molding for providing the expanded beads molded article of the present invention is preferably performed by a pressure molding method (see, for example, JP 51-22951 B), in which the expanded beads are subjected in advance to a pressure treatment with a pressurized gas, such as air, to increase the pressure inside the expanded beads for controlling the pressure inside the expanded beads to 0.01 MPa (G) or more and 0.2 MPa (G) or less (G means the gauge pressure), then the expanded beads are filled in a cavity of a mold under the atmospheric pressure or reduced pressure, followed by closing the mold, and then a heating medium, such as steam, is introduced into the mold, whereby the expanded beads are subjected to fusion bonding with heat. The expanded beads may also be molded by a compression filling molding method (see JP 4-46217 B), in which in a cavity having been pressurized with a compression gas to a pressure higher than the atmospheric pressure, the expanded beads pressurized to that pressure or higher are filled, and then a heating medium, such as steam, is introduced into the cavity to perform heating, whereby the expanded beads are subjected to fusion bonding with heat. In addition, the expanded beads may be molded by an ordinary pressure filling molding method (see JP 6-49795 B), in which the expanded beads having a high secondary expanding force obtained under a special condition are filled in a cavity of a pair of positive and negative molds under the atmospheric pressure or reduced pressure, and then a heating medium, such as steam, is introduced into the cavity to perform heating, whereby the expanded beads are subjected to fusion bonding with heat, the method combining the aforementioned methods (see JP 6-22919 B), or the like.

In the specific in-mold molding for providing the expanded beads molded article of the present invention, the expanded beads molded article excellent in repulsion can be obtained in the case where the expanded beads are filled in the mold to make a cracking of 10% by volume or more, and preferably 15% by volume or more, and of 250% by volume or less, and preferably 220% by volume or less.

As for the meaning of cracking, in filling expanded beads to a cavity of a mold, an opening of the mold that prevents the mold from being completely closed, for efficiently filling the expanded beads exceeding the cavity volume, is referred to as a cracking, which is expressed by the ratio (%) of the volume of the opening with respect to the cavity volume of the mold. After filling the expanded beads in the mold, the cracking is finally closed in introducing steam, and as a result, the filled expanded beads are compressed.

EXAMPLES

The present invention will be described in more detail with reference to the following examples, but the present invention is not limited to the examples.

Evaluation

The expanded beads and the expanded beads molded articles used in Examples and Comparative Examples were subjected to the following evaluation. In the evaluation of the molded article, a specimen obtained by allowing the expanded beads molded article having been subjected to the aging and the like to stand under conditions of 23° C. and a humidity of 50% for 24 hours was measured.

Weight of Expanded Beads

The bead weight was obtained in such a manner that 100 beads were randomly selected, the total weight (unit: mg) of the selected 100 beads was measured, and the measured weight was divided by 100 to provide a value, which was designated as the average bead weight (unit: mg).

Apparent Density of Expanded Beads

The apparent density of the expanded beads was obtained in such a manner that a measuring cylinder having ethanol placed therein was prepared, in which 500 or more expanded beads (weight of the group of expanded beads: Wt) were submerged with a metallic mesh, and the volume of the group of expanded beads obtained from the elevation of the ethanol level was divided by the weight of the group of expanded beads.

Average Cell Diameter of Expanded Beads

The measurement was performed by the aforementioned measurement method for 30 expanded beads, and the arithmetic average value was obtained.

Density of Expanded Beads Molded Article (Molded Article Density)

The volume V of the expanded beads molded article was obtained by the submersion method, and the density thereof was obtained by dividing the weight W (g) of the molded article by the volume V (L) thereof (W/V).

Modulus of Repulsion Elasticity (R1) of Expanded Beads Molded Article

The modulus of repulsion elasticity (R1) of the expanded beads molded article was measured according to JIS K6255 (2013) with a Schob type repulsion elasticity tester "RT-90" (produced by Kobunshi Keiki Co., Ltd.) under conditions of a relative humidity of 50% and 23° C. A specimen of 30 mm in length, 30 mm in width, and 12.5 mm in thickness (including the molding skin surface) was cut out from the center portion of the aged expanded beads molded article. The specimen was fixed with a double-sided adhesive tape with the skin surface of the specimen becoming a surface in contact with the end of the pendulum, and the pendulum having a hammer diameter of 15 mm and an arm weight of 0.25 kg was allowed to fall down from the position of a lift angle of 90±1°. The pendulum was allowed to be in contact with the skin surface of the specimen in the thickness direction thereof, and the rebound height h (mm) of the pendulum was measured. The rebound height h (mm) was divided by the fall height H (mm) of the pendulum, and the average value of the measured values of five points was designated as the modulus of repulsion elasticity.

Modulus of Repulsion Elasticity (R2) of Block Copolymer (I)

For the modulus of repulsion elasticity (R2) of the block copolymer (I) was obtained in the following manner, the expanded beads molded article was sufficiently defoamed by heat press at 230° C. several times, and a sheet having a thickness of 12.5 mm was produced. A specimen of 30 mm in length, 30 mm in width, and 12.5 mm in thickness (including the molding skin surface) was cut out from the center portion of the sheet. The specimen was measured according to JIS K6255 (2013) with a Schob type repulsion elasticity tester "RT-90" (produced by Kobunshi Keiki Co., Ltd.) under conditions of a relative humidity of 50% and 23° C. The average value of the measured values of five points was designated as the modulus of repulsion elasticity.

Flexural Modulus of Block Copolymer (I)

The flexural modulus of the block copolymer (I) was measured according to the measurement method described in JIS K7171 (2016). In the measurement, a test piece of 80×10×4 mm was prepared and subjected to three-point flexure with a 10 kg load cell under conditions of a supporting point distance of 64 mm and a flexure rate of 2 mm/min. The flexural modulus was calculated from the gradient between the displacement of 0.5 mm or more and 1.0 mm or less.

Hot Xylene Insoluble Fraction of Expanded Beads Molded Article

A specimen of 1.0 g was cut out from the center portion of the expanded beads molded article, and measured according to the aforementioned measurement method. The average value of the measured values of five points was designated as the xylene insoluble fraction.

Closed Cell Ratio of Expanded Beads Molded Article

A measurement specimen of 25×25×30 mm excluding the skin layer was cut out from the center portion of the expanded beads molded article, and the specimen was allowed to stand in a thermostat chamber under conditions of the atmospheric pressure, a relative humidity of 50%, and 23° C. for 1 day, and then measured for the apparent volume Va of the specimen by the submersion method. The measurement specimen having been measured for the apparent volume Va was sufficiently dried, and then measured for the true volume Vx of the measurement specimen according to Procedure C described in ASTM D2856-70 with Air Pycnometer 930 (produced by Toshiba Beckman Co., Ltd.). The closed cell ratio was calculated based on the volumes Va and Vx according to the following expression (4), and the average value of the five measured values was designated as the closed cell ratio of the expanded beads molded article.

$$\text{Closed cell ratio (\%)} = (Vx - W/\rho) \times 100 / (Va - W/\rho) \quad (4)$$

In the expression,

Vx represents the true volume of the expanded beads molded article measured by the aforementioned method, which is the sum of the volume of the block copolymer (I) constituting the expanded beads molded article and the total volume of the cells of the closed cell portion inside the expanded beads molded article (cm$^3$), Va represents the apparent volume of the expanded beads molded article measured from the elevation of the water level when the expanded beads molded article is submerged in a measuring cylinder having water therein (cm$^3$), W represents the weight of the measurement specimen of the expanded beads molded article (g), and $\rho$ represents the density of the block copolymer (I) constituting the expanded beads molded article (g/cm$^3$).

Average Cell Wall Thickness of Expanded Beads Molded Article

The thickness of the cell wall was measured according to the aforementioned measurement method for 10 positions, and the arithmetic average value of these values was obtained.

25% Compression Set of Expanded Beads Molded Article at 50° C.

5 test pieces each in the form of a cuboid having a length of 50 mm, a width of 50 mm, and a thickness of 25 mm were cut out from the expanded beads molded article while removing the skin layer formed in molding, allowed to stand in a state of compression by 25% in the thickness direction under an environment of a relative humidity of 50% at each of temperatures of 23° C. and 50° C. for 22 hours according to JIS K6767 (1999), and measured for the thickness after 24 hours from the release of compression, from which the compression set (%) was obtained for each of the test pieces, and the arithmetic average value was designated as the compression set (%).

Surface Hardness of Expanded Beads Molded Article

The type C durometer hardness of the surface of the expanded beads molded article can be measured by mounting a durometer C defined in JIS K7312 (1996) ("Asker Rubber Hardness Meter Type C", a trade name, produced by Kobunshi Keiki Co., Ltd.) on a constant pressure load instrument "CL-150L" (produced by Kobunshi Keiki Co., Ltd.). Arbitrary 10 positions on each of the both surfaces of the expanded beads molded article excluding the end portions of the molded article were measured, and the arithmetic average value thereof was obtained. The measurement was performed by excluding the void portions existing on the surface of the expanded beads molded article.

Tensile Strength and Tensile Elongation of Expanded Beads Molded Article

A cut-out piece was produced according to JIS K6767 (1999) to have cut surfaces on all the surfaces thereof (excluding the skin portion) obtained from the expanded beads molded article with a vertical slicer, and cut with a jig saw into the No. 1 dumbbell form (having a measurement portion having a length of 40 mm, a width of 10 mm, and a thickness of 10 mm), which was designated as a test piece. The test piece was subjected to a tensile test at a test speed of 500 mm/min, and measured for the maximum load and the distance between the gauge lines at breakage, in which the maximum tensile stress under tension was designated as the tensile strength, and the elongation at breakage was designated as the tensile elongation.

Example 1

Production of Particles of Block Copolymer (I)

To 100 parts by weight of a multi-block copolymer having a polyethylene block and an ethylene-α-olefin copolymer block having a density of 887 kg/m$^3$, a melting point of 120° C., a melt flow rate of 5.4 g/10 min (190° C., load: 2.16 kg), a type A durometer hardness of 86, a flexural modulus of 28 MPa, and a modulus of repulsion elasticity of 55% ("INFUSE 9530", produced by The Dow Chemical Company) (thermoplastic polyolefin (which may hereinafter referred to as "TPO")), zinc borate (which may be hereinafter referred to as "ZnB", "Zinc Borate 2335", produced by Tomita Pharmaceutical Co., Ltd., average particle diameter: 6 μm) as a cell controlling agent was added in an amount of 1,000 ppm, and the mixture was placed in an extruder, melt-kneaded, extruded from a die with a diameter of 2 mm into the form of strand, cooled in water, and then granulated by cutting with a pelletizer to a particle weight of approximately 5 mg, so as to provide polymer particles of the multi-block copolymer.

Production of Expanded Beads 1 kg of the resulting polymer particles, 3 L of water as a dispersing medium, 3 g of kaolin and 0.04 g of a sodium alkylbenzenesulfonate as dispersants, and 0.8 part by weight of dicumyl peroxide as a crosslinking agent and 7 parts by weight of carbon dioxide (dry ice) as a blowing agent, per 100 parts by weight of the polymer particles, were charged in a closed vessel having a capacity of 5 L, and heated to 160° C. as the crosslinking and expanding temperature under agitation, which was retained for 30 minutes. Thereafter, while controlling the pressure in the vessel to a constant value of 4.0 MPa (G) by applying a back pressure with carbon dioxide, the particles impregnated with the blowing agent were discharged to the atmospheric pressure along with the dispersing medium at the temperature of the dispersing medium (expanding temperature) shown in Table 1, so as to provide expanded beads.

Production of Expanded Beads Molded Article

The resulting expanded beads were placed in a closed vessel, pressurized with compressed air of 0.2 MPa (G) for 12 hours to impart an internal pressure of 0.10 MPa (G) to the expanded beads, and after taking out from the vessel, subjected to in-mold molding in such a manner that the expanded beads were filled in a flat plate mold having a length of 250 mm, a width of 200 mm, and a thickness of 33 mm while the mold was not completely closed with an opening of the mold of 6.6 mm (the volume of the opening of the mold was 330 cm$^3$), and were heated with steam and then cooled, and a molded article was taken out from the mold, and the resulting expanded beads molded article was aged in an oven adjusted to 60° C. for 12 hours, and taken out therefrom, thereby providing an expanded beads molded article. The resulting molded article was evaluated for the molded article density, the modulus of repulsion elasticity, the hot xylene insoluble fraction, the surface hardness, and the like. The results are shown in Table 1 along with the conditions.

Example 2

The same procedures were performed as in Example 1 except that expanded beads having a different apparent density were used, and the conditions in Table 1 were changed to provide an expanded beads molded article having a different molded article density.

Example 3

The same procedures were performed as in Example 1 except that expanded beads having a different apparent density were used, and the conditions in Table 1 were changed to provide an expanded beads molded article having a different molded article density.

Example 4

The same procedures were performed as in Example 1 except that a multi-block copolymer having a polyethylene block and an ethylene-α-olefin copolymer block having a density of 877 kg/m$^3$, a melting point of 120° C., a melt flow rate (MFR) of 5.7 g/10 min (190° C., load: 2.16 kg), a type A durometer hardness of 76, a flexural modulus of 13 MPa, and a modulus of repulsion elasticity of 57% ("INFUSE 9500", produced by The Dow Chemical Company) was used as the raw material, and the conditions in Table 1 were changed to provide expanded beads and an expanded beads molded article.

Example 5

The same procedures were performed as in Example 4 except that expanded beads having a different apparent density were used, and the conditions in Table 1 were changed to provide an expanded beads molded article.

Comparative Example 1

The same procedures were performed as in Example 1 except that the conditions in Table 1 were changed to provide an expanded beads molded article. The molded article density was high, and the modulus of repulsion elasticity was not satisfied.

Comparative Example 2

The same procedures were performed as in Example 1 except that the conditions in Table 1 were changed to provide an expanded beads molded article. The molded article density was high, and the modulus of repulsion elasticity was not satisfied.

Comparative Example 3

Production of Particles of Thermoplastic Polyurethane

To 100 parts by weight of a commercial grade thermoplastic polyurethane (which may be hereinafter referred to as "TPU") raw material having a density of 1,120 kg/m$^3$ ("DP9385A", produced by Covestro AG, softening point: 140° C., MFR: 14 g/10 min (190° C., 10 kgf)), 0.10 part by weight of talc (grade name: KHP-125B, a trade name, produced by Hayashi Kasei Co., Ltd., particle diameter providing cumulative volume of 50% with respect to volume of all particles (d50): 7 μm) as a cell controlling agent was added, and the mixture was melt kneaded in a twin-screw extruder. The kneaded product was extruded from the extruder having an inner diameter of 20 mm into water and cut (underwater cutting method), and extruded from a small hole of a die attached to the end thereof into a strand form, cooled, and then cut to provide TPU resin particles of approximately 5 mg.

Production of Expanded Beads 1 kg of the TPU particles obtained above and 3 L of water as a dispersing medium were charged in a 5 L closed vessel equipped with an agitator, to which 0.1 part by weight of kaolin as a dispersant and 0.004 part by weight of sodium alkylbenzenesulfonate as a dispersing aid were added per 100 parts by weight of the TPU particles.

Under agitation, the mixture was heated to the prescribed impregnation temperature, and carbon dioxide as a blowing agent was added to the closed vessel to control the pressure in the vessel to a constant value of 3.5 MPa (G), followed by retaining at the prescribed expanding temperature for 15 minutes. Thereafter, while controlling the pressure in the vessel to a constant value by applying a back pressure with nitrogen, the expandable particles impregnated with the blowing agent were discharged to the atmospheric pressure along with the dispersing medium, so as to provide TPU expanded beads having the dispersant attached to the surface thereof.

Production of Expanded Beads Molded Article

The expanded beads produced above were charged in a mold cavity having a length of 200 mm, a width of 65 mm, and a thickness of 33 mm in a state with a cracking of 100%, followed by closing the mold, and in-mold molding was performed by heating with steam at the prescribed molding pressure. After cooling to ordinary temperature, the molded article was taken out from the mold, so as to provide an expanded beads molded article having a plate shape.

Comparative Example 4

An expanded beads molded article was obtained in the same manner as in Comparative Example 3 except that the conditions shown in Table 1 were changed.

The properties of the resulting expanded beads molded articles are also shown in Table 1.

It is understood from Examples 1 to 3 and Examples 4 and 5 that in Examples, there is a tendency that the modulus of repulsion elasticity of the molded article is increased by decreasing the molded article density. It is understood from the comparison to the relationship of Comparative Examples 1 and 2 that the effect of enhancing the modulus of repulsion elasticity is particularly excellent in a range of the molded article density of 30 kg/m³ or more and 150 kg/m³ or less as in Examples.

It is understood from the comparison of Comparative Examples 3 and 4 that in the ordinary thermoplastic polyurethane expanded beads, it is difficult to provide light-weight expanded beads, failing to provide an expanded beads molded article achieving both the repulsion and the lightweight property. It is also understood from the comparison of Comparative Examples 3 and 4 that the modulus of repulsion elasticity of the molded article is decreased by decreasing the molded article density.

expanded beads of a block copolymer of a polyethylene block and an ethylene-α-olefin copolymer block, in which the expanded beads molded article has a density of 30 kg/m³ or more and less than 150 kg/m³, and the expanded beads molded article has a modulus of repulsion elasticity of 60% or more. The expanded beads molded article of the present invention is excellent in light weight property and repulsion, and can be suitably utilized as a seat cushioning material, a pad material for sporting, a sole member, a floor material, and the like.

The invention claimed is:

1. An expanded beads molded article, comprising a block copolymer of a polyethylene block and an ethylene-α-olefin copolymer block and having a density of 30 kg/m³ or more and 140 kg/m³ or less, a tensile elongation of 150% or more and 300% or less, a modulus of repulsion elasticity (R1) of

TABLE 1

| | | | Example | | | | | Comparative Example | | | |
|---|---|---|---|---|---|---|---|---|---|---|---|
| | | | 1 | 2 | 3 | 4 | 5 | 1 | 2 | 3 | 4 |
| Crosslinked resin particles | Resin | Kind | TPO | TPO | TPO | TPO | TPO | TPO | TPO | TPU (ether) | TPU (ether) |
| | | Grade | INFUSE 9530 | INFUSE 9530 | INFUSE 9530 | INFUSE 9500 | INFUSE 9500 | INFUSE 9530 | INFUSE 9530 | 9385A | 9385A |
| | Cell controlling agent | Kind | ZnB | ZnB | ZnB | ZnB | ZnB | ZnB | ZnB | talc | talc |
| | | Added amount ppm | 1000 | 1000 | 1000 | 1000 | 1000 | 1000 | 1000 | 1000 | 1000 |
| Expanding condition | Amount of blowing agent | part by weight | 7 | 4 | 2 | 8 | 2 | 1 | 2 | 0 | 0 |
| | Impregnation temperature | °C. | 110 | 110 | 110 | 110 | 110 | 110 | 110 | — | — |
| | Impregnation time | min | 30 | 30 | 30 | 30 | 30 | 30 | 30 | — | — |
| | Crosslinking temperature | °C. | 160 | 160 | 160 | 160 | 160 | 160 | 160 | 129 | 132 |
| | Retention time | min | 30 | 30 | 30 | 30 | 30 | 30 | 30 | 15 | 15 |
| | Expanding temperature | °C. | 160 | 160 | 160 | 160 | 160 | 160 | 160 | 129 | 132 |
| | Pressure of steam | MPa (G) | 4 | 2.5 | 1.5 | 4 | 1.7 | 1.2 | 1.4 | 3.5 | 4 |
| Expanded beads | Weight of expanded beads | mg | 5 | 5 | 5 | 5 | 5 | 5 | 5 | 5 | 5 |
| | Apparent density | kg/m³ | 83 | 101 | 154 | 94 | 176 | 218 | 204 | 180 | 130 |
| | Average cell diameter (a) | μm | 113 | 90 | 105 | 115 | 152 | 168 | 160 | 176 | 192 |
| Molding condition | Internal pressure | MPa (G) | 0.10 | 0.10 | 0.10 | 0.10 | 0.1 | 0.10 | 0.1 | 0 | 0 |
| | Cracking | % | 20 | 20 | 20 | 20 | 20 | 20 | 20 | 100 | 100 |
| | Molding pressure | MPa (G) | 0.16 | 0.20 | 0.2 | 0.12 | 0.14 | 0.2 | 0.2 | 0.18 | 0.15 |
| Expanded beads molded article | Molded article density | kg/m³ | 53 | 78 | 121 | 66 | 146 | 218 | 158 | 220 | 180 |
| | Modulus of repulsion elasticity of molded article (R1) | % | 66 | 65 | 62 | 69 | 65 | 58 | 59 | 64 | 63 |
| | Modulus of repulsion elasticity of copolymer (R2) | % | 51 | 51 | 51 | 53 | 53 | 51 | 51 | 56 | 56 |
| | R1/R2 | — | 1.29 | 1.27 | 1.22 | 1.30 | 1.23 | 1.14 | 1.16 | 1.14 | 1.13 |
| | Flexural modulus of copolymer | MPa | 30 | 30 | 30 | 15 | 15 | 30 | 30 | 10 | 10 |
| | Xylene insoluble fraction | % by weight | 54 | 55 | 52 | 54 | 48 | 50 | 54 | — | — |
| | Closed cell ratio | % | 70 | 72 | 80 | 70 | 80 | 85 | 82 | 85 | 85 |
| | Average cell wall thickness | μm | 2.3 | 2.3 | 4.2 | 2.7 | 7.2 | 10.2 | 9.0 | 8.5 | 6.4 |
| | 25% Compression stress at 23° C. | % | 1.4 | 1.6 | 2.0 | 1.2 | 2.0 | 2.0 | 2.0 | 1.8 | 1.8 |
| | 25% Compression stress at 50° C. | % | 11 | 7 | 6 | 13 | 6 | 6 | 6 | 10 | 12 |
| | Durometer hardness (C type) | — | 18 | 24 | 35 | 18 | 36 | 52 | 45 | 41 | 38 |
| | Tensile strength | MPa | 0.29 | 0.42 | 0.55 | 0.26 | 0.38 | 0.47 | 0.47 | 1.30 | 1.2 |
| | Tensile elongation | % | 171 | 202 | 165 | 230 | 184 | 100 | 114 | 240 | 240 |

The expanded beads molded article of the present invention is an expanded beads molded article containing 65% or more and 80% or less, and an average cell wall thickness of 1 μm or more and 6 μm or less.

2. The expanded beads molded article according to claim 1, which has a ratio (R1/R2) of the modulus of repulsion elasticity (R1) of the expanded beads molded article to a modulus of repulsion elasticity (R2) of the block copolymer constituting the expanded beads molded article of 1.2 or more and 2.0 or less.

3. The expanded beads molded article according to claim 1, which has a closed cell ratio of 60% or more.

4. The expanded beads molded article according to claim 1, which has a xylene insoluble fraction of 30% by weight or more and 70% by weight or less based on the total amount of the expanded beads molded article by a hot xylene extraction method.

5. The expanded beads molded article according to claim 1, which has a 25% compression set at 50° C. of 2% or more and 15% or less.

6. The expanded beads molded article according to claim 1, which has a surface of the molded article having a type C durometer hardness of 15 or more and 50 or less.

7. The expanded beads molded article according to claim 1, wherein the block copolymer is a multi-block copolymer of a polyethylene block and an ethylene-1-octene copolymer block.

8. A footwear sole member comprising the expanded beads molded article according to claim 1.

9. The expanded beads molded article according to claim 1, obtained by filling expanded beads prepared of the block copolymer of the polyethylene block and the ethylene-α-olefin copolymer block in the presence of a cell controlling agent and having an internal pressure of 0.01 MPa (G) or more and 0.2 MPa (G) or less, in a mold and heating with a heating medium for molding by introducing the heating medium and thereby compressing the filled expanded beads for molding, wherein in filling the expanded beads to a cavity of the mold, the cracking ratio (%) of the volume of an opening of the mold that prevents the mold from being completely closed is 10% by volume or more and 220% by volume or less with respect to the cavity volume of the mold.

* * * * *